(12) United States Patent
Huang et al.

(10) Patent No.: US 10,104,033 B2
(45) Date of Patent: Oct. 16, 2018

(54) METHOD FOR SENDING MESSAGE, METHOD FOR READING AND NOTIFYING MESSAGE, METHOD FOR RECEIVING MESSAGE, AND APPARATUS

(71) Applicant: Huawei Technologies Co., Ltd., Shenzhen (CN)

(72) Inventors: Xiaoqiong Huang, Shenzhen (CN); Feng Zhang, Shenzhen (CN); Liang Li, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 649 days.

(21) Appl. No.: 14/323,539

(22) Filed: Jul. 3, 2014

(65) Prior Publication Data
US 2014/0342763 A1  Nov. 20, 2014

Related U.S. Application Data (63) Continuation of application No. PCT/CN2013/075615, filed on May 14, 2013.

(51) Int. Cl.
*H04W 4/12* (2009.01)
*H04L 12/58* (2006.01)
*H04W 4/14* (2009.01)

(52) U.S. Cl.
CPC ............ *H04L 51/34* (2013.01); *H04W 4/14* (2013.01); *H04L 51/38* (2013.01)

(58) Field of Classification Search
CPC .......... H04L 51/34; H04L 51/38; H04W 4/14; H04W 4/12
See application file for complete search history.

(56) References Cited

U.S. PATENT DOCUMENTS

| | | | |
|---|---|---|---|
| 6,999,993 B1* | 2/2006 | Shah | H04L 12/5855 709/207 |
| 8,359,289 B1* | 1/2013 | Low | G06Q 10/107 707/608 |
| 2001/0005859 A1* | 6/2001 | Okuyama | H04L 29/00 709/245 |
| 2002/0019848 A1* | 2/2002 | Sugawara | H04L 12/5875 709/206 |

(Continued)

FOREIGN PATENT DOCUMENTS

| | | |
|---|---|---|
| CN | 1744729 A | 3/2006 |
| CN | 1832606 A | 9/2006 |
| CN | 1863328 A | 11/2006 |

OTHER PUBLICATIONS

Foreign Communication From a Counterpart Application, PCT Application No. PCT/CN2013/075615, International Search Report dated Feb. 27, 2014, 6 pages.

(Continued)

*Primary Examiner* — Oanh Duong
(74) *Attorney, Agent, or Firm* — Conley Rose, P.C.

(57) ABSTRACT

A method for sending a message, a method for reading and notifying a message, a method for receiving a message, and an apparatus are provided. Reading status of a message to be read is fed back, so that a user at a sending end can know in time whether the short message has already been read, which improves communication efficiency and enhances user awareness of the reading status of the message to be read.

18 Claims, 8 Drawing Sheets

(56) References Cited

U.S. PATENT DOCUMENTS

| | | | | |
|---|---|---|---|---|
| 2002/0129108 | A1* | 9/2002 | Sykes, Jr. | G06Q 10/107 709/206 |
| 2003/0096600 | A1* | 5/2003 | Lewis | H04L 29/06 455/412.1 |
| 2003/0101283 | A1* | 5/2003 | Lewis | H04L 12/2856 709/246 |
| 2003/0110212 | A1* | 6/2003 | Lewis | H04L 29/06 709/203 |
| 2003/0131311 | A1* | 7/2003 | McNamara | H04L 12/2856 714/809 |
| 2003/0153302 | A1* | 8/2003 | Lewis | G06Q 20/102 455/412.1 |
| 2003/0229722 | A1* | 12/2003 | Beyda | G06Q 10/107 719/310 |
| 2004/0015548 | A1* | 1/2004 | Lee | H04L 12/1827 709/204 |
| 2004/0087300 | A1* | 5/2004 | Lewis | H04L 45/04 455/412.2 |
| 2005/0036167 | A1* | 2/2005 | Atsumi | H04N 1/32363 358/1.15 |
| 2005/0188037 | A1* | 8/2005 | Hamaguchi | G06Q 10/107 709/206 |
| 2006/0010218 | A1* | 1/2006 | Turcotte, II | H04L 12/1859 709/206 |
| 2006/0240803 | A1* | 10/2006 | Valeriano | H04L 67/26 455/412.1 |
| 2007/0165790 | A1* | 7/2007 | Taori | H04M 3/5307 379/67.1 |
| 2008/0037722 | A1* | 2/2008 | Klassen | H04L 12/581 379/88.12 |
| 2008/0294735 | A1* | 11/2008 | Muntermann | H04L 12/5855 709/206 |
| 2009/0254971 | A1* | 10/2009 | Herz | G06Q 10/10 726/1 |
| 2010/0304766 | A1* | 12/2010 | Goyal | H04L 51/34 455/466 |
| 2011/0202756 | A1* | 8/2011 | West | H04L 12/584 713/152 |
| 2012/0077526 | A1* | 3/2012 | Riffe | H04W 4/001 455/466 |
| 2012/0179767 | A1 | 7/2012 | Clarke et al. | |
| 2012/0184248 | A1* | 7/2012 | Speede | H04W 4/14 455/411 |
| 2012/0317218 | A1* | 12/2012 | Anderson | H04N 21/4786 709/206 |
| 2013/0212202 | A1* | 8/2013 | Lee | G06Q 10/107 709/206 |
| 2013/0290436 | A1* | 10/2013 | Martin | G06Q 10/107 709/206 |
| 2014/0172988 | A1* | 6/2014 | Baldwin | H04L 51/12 709/206 |

OTHER PUBLICATIONS

Foreign Communication From a Counterpart Application, PCT Application No. PCT/CN2013/075615, Written Opinion dated Feb. 27, 2014, 6 pages.

Partial English Translation and Abstract of Chinese Patent Application No. CN1863328A, dated Apr. 29, 2014, 5 pages.

Foreign Communication From A Counterpart, European Application No. 13836238.9, Extended European Search Report dated Mar. 30, 2015, 10 pages.

"Digital cellular telecommunications system (Phase 2+); Universal Mobile Telecommunications System (UMTS): Technical realization of the Short Message Service (SMS) (3GPP TS 23.040 version 115.0 Release 11)," XP014156370, ETSI TS 123 040 V11.5.0, Apr. 2013, 208 pages.

Foreign Communication From A Counterpart Application, European Application No. 13836238.9, European Office Action dated Oct. 6, 2017, 8 pages.

* cited by examiner

METHOD FOR SENDING MESSAGE, METHOD FOR READING AND NOTIFYING MESSAGE, METHOD FOR RECEIVING MESSAGE, AND APPARATUS

CROSS-REFERENCE TO RELATED APPLICATIONS

This application is a continuation of International Application No. PCT/CN2013/075615, filed on May 14, 2013, which is hereby incorporated by reference in its entirety.

STATEMENT REGARDING FEDERALLY SPONSORED RESEARCH OR DEVELOPMENT

Not applicable.

REFERENCE TO A MICROFICHE APPENDIX

Not applicable.

TECHNICAL FIELD

Embodiments of the present invention relate to wireless communications technologies, and in particular, to a method for sending a message, a method for reading and notifying a message, a method for receiving a message, and an apparatus.

BACKGROUND

Figure 1:
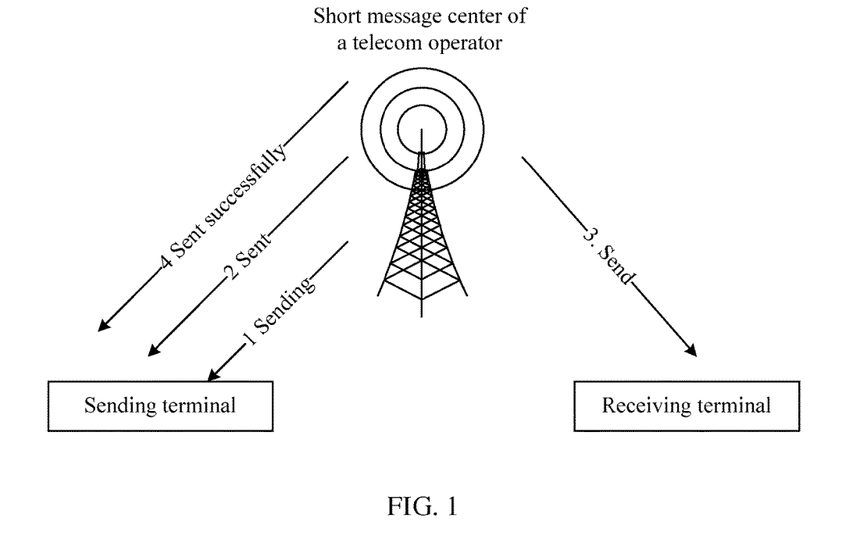
FIG. 1 is a schematic diagram of a process of sending a short message in the prior art.

With constant development of mobile technologies, a short messaging service (SMS) has already become a common communications manner of people. FIG. 1 is a schematic diagram of a process of sending a short message in the prior art. As shown in FIG. 1, after a short message application client at a sending end submits a request for sending a short message to a short message center of an operator, the short message center returns a receiving response, and sends a short message to a receiving end; after the receiving end returns a receiving response to the short message center, the short message center sends a receiving status report of the short message to the sending end. Then, the process of sending a short message ends.

It may be known from the above that in the prior art, in settings for sending a short message, only a setting with respect to a short message receiving status report is available; a user at the sending end can know, according to the short message receiving status report, whether the short message has already been sent to the receiving end, but cannot know whether a user at the receiving end has already read the short message, that is, the user at the sending end cannot obtain reading status of the short message at the receiving end. In this case, an accurate and immediate feedback cannot be made for an issue that requires communication of time validity, thereby causing low communication efficiency.

SUMMARY

According to a first aspect, an embodiment of the present invention provides a method for sending a message, including: sending a message to be read to a receiving end, where the message to be read includes at least message content, a receiving end number, and a message number used to identify the message to be read; receiving a feedback message returned by a server, where the feedback message includes the receiving end number and the message number, and the feedback message is sent by the server after the server receives a response message that is sent by the receiving end and carries the receiving end number and the message number, where the response message is sent by the receiving end to the server after the receiving end confirms that the message to be read has been read; and changing, according to the feedback message, status of the message to be read corresponding to the message number and in a session list corresponding to the receiving end number to read status.

According to a second aspect, an embodiment of the present invention provides a method for reading and notifying a message, including: receiving a response message that is sent by a receiving end and carries a receiving end number and a message number, where the response message is sent by the receiving end after the receiving end confirms that a message to be read sent by a sending end to the receiving end has been read; and the message to be read includes at least message content, the receiving end number, and the message number used to identify the message to be read; and sending a feedback message to the sending end, where the feedback message includes the receiving end number and the message number, so that the sending end changes, according to the feedback message, status information of a message corresponding to the message number and in a session list corresponding to the receiving end number to read status.

According to a third aspect, an embodiment of the present invention provides a method for receiving a message, including: receiving a message to be read from a sending end, where the message to be read includes at least message content, a receiving end number, and a message number used to identify the message to be read; and sending, after the message to be read has been read, a response message to a server, where the response message includes the receiving end number and the message number, so that the server sends a feedback message that carries the receiving end number and the message number to the sending end and the sending end changes, according to the feedback message, status information of a message corresponding to the message number and in a session list corresponding to the receiving end number to read status.

According to a fourth aspect, an embodiment of the present invention provides an apparatus for sending a message, including: a first sending module configured to send a message to be read to a receiving end, where the message to be read includes at least message content, a receiving end number, and a message number used to identify the message to be read; a first receiving module configured to receive a feedback message returned by a server, where the feedback message includes the receiving end number and the message number, and the feedback message is sent by the server after the server receives a response message that is sent by the receiving end and carries the receiving end number and the message number, where the response message is sent by the receiving end to the server after the receiving end confirms that the message to be read has been read; and a processing module configured to change, according to the feedback message, status of the message to be read corresponding to the message number and in a session list corresponding to the receiving end number to read status.

According to a fifth aspect, an embodiment of the present invention provides a server, including: a second receiving module configured to receive a response message that is sent by a receiving end and carries a receiving end number and a message number, where the response message is sent by the receiving end after the receiving end confirms that a message to be read sent by a sending end to the receiving end has been read; and the message to be read includes at least message content, the receiving end number, and the message number used to identify the message to be read; and a second sending module configured to send a feedback message to the sending end, where the feedback message includes the receiving end number and the message number, so that the sending end changes, according to the feedback message, status information of a message corresponding to the message number and in a session list corresponding to the receiving end number to read status.

According to a sixth aspect, an embodiment of the present invention provides an apparatus for receiving a message, including: a third receiving module configured to receive a message to be read from a sending end, where the message to be read includes at least message content, a receiving end number, and a message number used to identify the message to be read; and a third sending module configured to send a response message to a server after the message to be read has been read, where the response message includes the receiving end number and the message number, so that the server sends a feedback message that carries the receiving end number and the message number to the sending end and the sending end changes, according to the feedback message, status information of a message corresponding to the message number and in a session list corresponding to the receiving end number to read status.

According to a seventh aspect, an embodiment of the present invention provides a network system, including the apparatus for sending a message provided in the foregoing fourth aspect, the server provided in the foregoing fifth aspect, and the apparatus for receiving a message provided in the foregoing sixth aspect.

According to an eighth aspect, an embodiment of the present invention provides an apparatus for sending a message, including: a transmitter configured to send a message to be read to a receiving end, where the message to be read includes at least message content, a receiving end number, and a message number used to identify the message to be read; a receiver configured to receive a feedback message returned by a server, where the feedback message includes the receiving end number and the message number, and the feedback message is sent by the server after the server receives a response message that is sent by the receiving end and carries the receiving end number and the message number, where the response message is sent by the receiving end to the server after the receiving end confirms that the message to be read has been read; and a processor, connected to the receiver and configured to change, according to the feedback message, status of the message to be read corresponding to the message number and in a session list corresponding to the receiving end number to read status.

According to a ninth aspect, an embodiment of the present invention provides a server, including: a receiver configured to receive a response message that is sent by a receiving end and carries a receiving end number and a message number, where the response message is sent by the receiving end after the receiving end confirms that a message to be read sent by a sending end to the receiving end has been read; and the message to be read includes at least message content, the receiving end number, and the message number used to identify the message to be read; and a transmitter configured to feed back a message to the sending end, where the feedback message includes the receiving end number and the message number, so that the sending end changes, according to the feedback message, status information of a message corresponding to the message number and in a session list corresponding to the receiving end number to read status.

According to a tenth aspect, an embodiment of the present invention provides an apparatus for receiving a message, including: a receiver configured to receive a message to be read from a sending end, where the message to be read includes at least message content, a receiving end number, and a message number used to identify the message to be read; and a transmitter configured to send a response message to a server after the message to be read has been read, where the response message includes the receiving end number and the message number, so that the server sends a feedback message that carries the receiving end number and the message number to the sending end and the sending end changes, according to the feedback message, status information of a message corresponding to the message number and in a session list corresponding to the receiving end number to read status.

According to an eleventh aspect, an embodiment of the present invention provides a network system, including the apparatus for sending a message provided in the foregoing eighth aspect, the server provided in the foregoing ninth aspect, and the apparatus for receiving a message provided in the foregoing tenth aspect.

In the method for sending a message, the method for reading and notifying a message, the method for receiving a message, and the apparatus provided in embodiments of the present invention, a reading status of a message to be read is fed back, so that a user at a sending end can know in time whether the short message has already been read, which improves communication efficiency and enhances user awareness of the reading status of the message to be read.

DETAILED DESCRIPTION

With respect to a defect in the prior art that in a process of sending a message, for example, a short message, only a setting of a short message receiving status report is available and a user at a sending end cannot know reading status of the short message at a receiving end, embodiments of the present invention provide a solution, that is, reading status of a short message is fed back, so that the user at the sending end can know in time whether the short message has already been read to improve communication efficiency.

Figure 2:
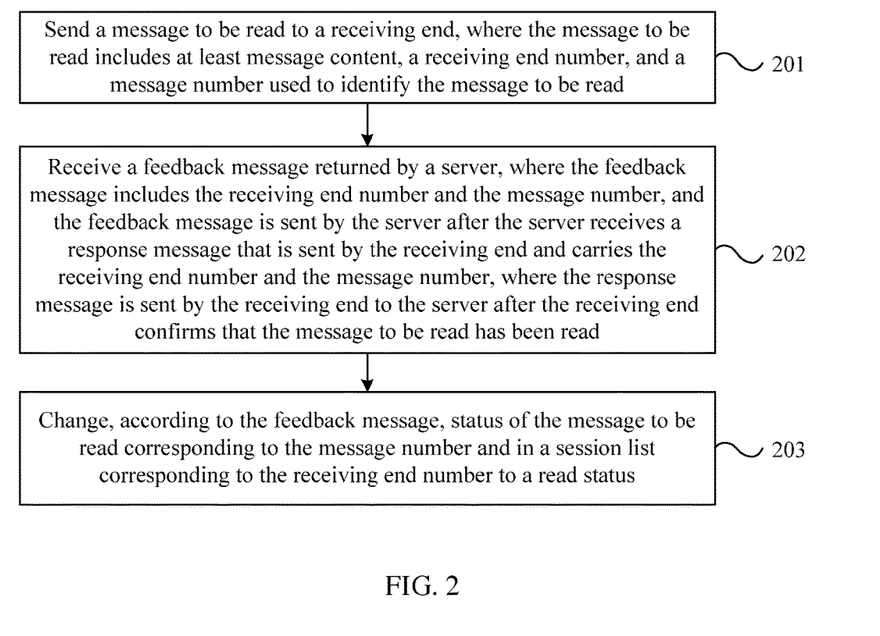
FIG. 2 is a flowchart of a method for sending a message according to an embodiment of the present invention.

FIG. 2 is a flowchart of a method for sending a message according to an embodiment of the present invention. As shown in FIG. 2, the method includes:

Step 201: Send a message to be read to a receiving end, where the message to be read includes at least message content, a receiving end number, and a message number used to identify the message to be read.

The message to be read in each embodiment of the present invention uses a short message as an example, and certainly is not limited to the short message. The embodiments of the present invention may also be applicable to a media message in another form.

After receiving message content edited by a user, the message application client at a sending end encapsulates the message content into a short message according to a specified transmission protocol, where the short message may include the message content and a receiving end number, for example, a mobile phone number of a user at the receiving end, and may further include a sending end number, for example, information such as a mobile phone number of a user at the sending end.

To accordingly identify which short message has been read by the receiving end, in this embodiment of the present invention, each message sent by the sending end to each receiving end is numbered, that is, a message number is allocated to each short message sent by the sending end to each receiving end, for example, "001", "002", and the like, and each message number may be allocated according to a sequence of sending time. Specifically, message numbers are allocated, in a time sequence, to all short messages sent by sending end A to receiving end B, for example, message numbers of two time-adjacent A→B short messages may be "001" and "002" respectively. Message numbers are also allocated, in a time sequence, to all short messages sent by sending end A to receiving end C, for example, message numbers of two time-adjacent A→C short messages may be "001" and "002" respectively. It may be understood that although message numbers of short messages sent to different receiving ends may be repeated, two short messages with the same message number may also be differentiated because the receiving ends have different receiving end numbers.

Currently, a commonly used mobile terminal can sort all interaction messages between the sending end and one receiving end in one session list, and each session list is differentiated by using the receiving end number.

In this embodiment of the present invention, the sending end sends the short message to the receiving end by using a network element device. Specifically, the sending end sends the short message in the following two different sending manners, which specifically include:

When a device at the sending end and a device at the receiving end can communicate over the Internet, for example, when the device at the sending end and the device at the receiving end are IPHONE 4 mobile phones in a network connected state and enable an "iMessage" function, the two IPHONE 4 mobile phones can send a short message over the Internet. In addition, this short message is sent by using a path different from a current path of sending a short message. This short message is not sent by means of a short message center on a mobile communications network, but is forwarded by using a message server on the Internet. This belongs to the prior art, and is not further described herein. That is, when the device at the sending end and the device at the receiving end can send a short message over the Internet, the network element device is a message server of a device on the Internet.

When the device at the sending end and the device at the receiving end cannot send a short message over the Internet, the network element device is a short message center on the mobile communications network.

Step 202: Receive a feedback message returned by a server, where the feedback message includes the receiving end number and the message number, and the feedback message is sent by the server after the server receives a response message that is sent by the receiving end and carries the receiving end number and the message number, where the response message is sent by the receiving end to the server after the receiving end confirms that the message to be read has been read.

After receiving the short message that carries the message number from the sending end, the foregoing network element sends the short message to the receiving end; after a message application client of the receiving end knows, by means of detection, that the user has read the short message, the message application client of the receiving end may send a response message to the server over, for example, an Internet Protocol (IP) network, and carry the receiving end number and the message number in the response message to notify the server that the short message sent by the sending end whose destination number is the receiving end number and whose number is the message number has already been read.

After receiving the foregoing response message, the server may also send a feedback message to the sending end over the IP network, and carry the receiving end number and the message number in the feedback message to indicate that the short message previously sent by the sending end whose destination number is the receiving end number and whose number is the message number has already been read. Each embodiment of the present invention is described by using an example that the feedback message and the response message are sent over the IP network, but is not limited thereto.

Step 203: Change, according to the feedback message, status of the message to be read corresponding to the message number and in a session list corresponding to the receiving end number to read status.

After receiving the feedback message and knowing that the short message has already been read, the sending end may change status of the short message corresponding to the message number and in the session list corresponding to the receiving end number to read status. In the session list, each short message has a different status at different phases. After the short message is sent and before the feedback message is received from the server, the status of the short message is "sent"; after receiving the feedback message from the server, the status of the short message is accordingly changed to "read". In this way, the user at the sending end can visually see the different status of the short message by using a display and clearly know whether the short message has been read.

In the method for sending a message provided by this embodiment of the present invention, reading status of a message to be read is fed back, so that a user at a sending end can know in time whether the short message has already been read, which improves communication efficiency and enhances user awareness of the reading status of the message to be read.

In the foregoing embodiment, after receiving a response message from the receiving end, the server knows that the short message has already been read, and may send, directly over the IP network, a feedback message that carries the receiving end number and the message number; after receiving the feedback message, the sending end may consider by default that the short message has already been read.

Of course, the server may also use other notification manners, for example, the server includes a message status code in the feedback message sent to the sending end, where the message status code is used to identify whether the message to be read has already been read. The message status code may represent different meanings by using different preset values, for example, "1" indicates that the message has already been read, and "0" indicates that the message has not been read. After receiving the response message from the receiving end, the server knows that the short message has already been read, and may send a feedback message over the IP network, where the feedback message not only includes the receiving end number and the message number but also the message status code with the value "1". After receiving the feedback message, the sending end may parse the value of the message status code to know that the short message has already been read.

Figure 3:
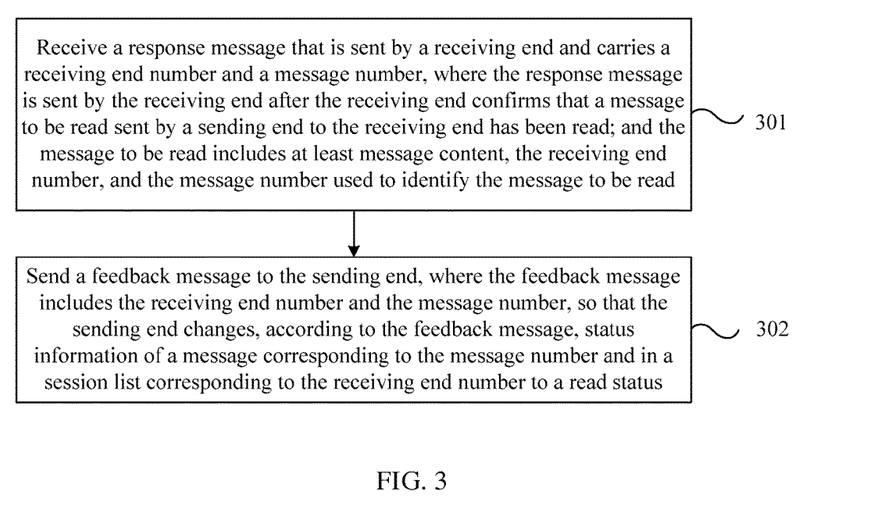
FIG. 3 is a flowchart of a method for reading and notifying a message according to an embodiment of the present invention.

FIG. 3 is a flowchart of a method for reading and notifying a message according to an embodiment of the present invention. As shown in FIG. 3, the method includes:

Step 301: Receive a response message that is sent by a receiving end and carries a receiving end number and a message number, where the response message is sent by the receiving end after the receiving end confirms that a message to be read sent by a sending end to the receiving end has been read; and the message to be read includes at least message content, the receiving end number, and the message number used to identify the message to be read.

After the receiving end receives a message to be read that carries the message number from the sending end, for example, a short message, the receiving end reads the short message; after the receiving end knows, by means of detection, that the short message has been read, the receiving end may send a response message to a server over, for example, an IP network, and carry the receiving end number and the message number in the response message to notify the server that the short message sent by the sending end whose destination number is the receiving end number and whose number is the message number has already been read.

Step 302: Send a feedback message to the sending end, where the feedback message includes the receiving end number and the message number, so that the sending end changes, according to the feedback message, status information of a message corresponding to the message number and in a session list corresponding to the receiving end number to read status.

After receiving the foregoing response message, the server may also send a feedback message to the sending end over the IP network, and carry the receiving end number and the message number in the feedback message to indicate that the short message previously sent by the sending end whose destination number is the receiving end number and whose number is the message number has already been read.

After receiving the feedback message and knowing that the short message has already been read, the sending end may change status of the short message corresponding to the message number and in the session list corresponding to the receiving end number to "read" status. In this way, a user at the sending end can visually see the different status of the short message by using a display, and clearly know whether the short message has already been read.

In the method for reading and notifying a message provided by this embodiment of the present invention, reading status of a message to be read is fed back, so that a user at a sending end can know in time whether the short message has already been read, which improves communication efficiency and enhances user awareness of the reading status of the message to be read.

In the foregoing embodiment, after receiving a response message from the receiving end, the server knows that the short message has already been read, and may send, directly over the IP network, a feedback message that carries the receiving end number and the message number; after receiving the feedback message, the sending end may consider by default that the short message has already been read.

Of course the server may also use other notification manners, for example, the server includes a message status code in the feedback message sent to the sending end, where the message status code is used to identify whether the message to be read has already been read. The message status code may represent different meanings by using different preset values, for example, "1" indicates that the message has already been read, and "0" indicates that the message has not been read. After receiving the response message from the receiving end, the server knows that the short message has already been read, and may send a feedback message over the IP network, where the feedback message includes not only the receiving end number and the message number but also the message status code with the value "1". After receiving the feedback message, the sending end may parse the value of the message status code to know that the short message has already been read.

Figure 4:
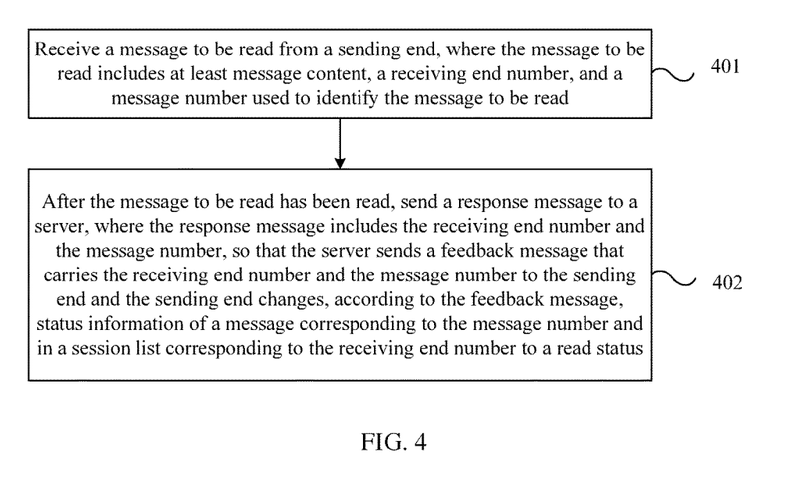
FIG. 4 is a flowchart of a method for receiving a message according to an embodiment of the present invention.

FIG. 4 is a flowchart of a method for receiving a message according to an embodiment of the present invention. As shown in FIG. 4, the method includes:

Step 401: Receive a message to be read from a sending end, where the message to be read includes at least message content, a receiving end number, and a message number used to identify the message to be read.

Step 402: After the message to be read has been read, send a response message to a server, where the response message includes the receiving end number and the message number, so that the server sends a feedback message that carries the receiving end number and the message number to the sending end and the sending end changes, according to the feedback message, status information of a message corresponding to the message number and in a session list corresponding to the receiving end number to read status.

After the receiving end receives a message to be read, for example, a short message that is sent by the sending end by using the foregoing network element device and knows, by means of detection, that the short message has been read, the receiving end may send a response message to the server over an IP network, and carry the receiving end number and the message number in the response message to notify the server that the short message sent by the sending end whose destination number is the receiving end number and whose number is the message number has already been read. For details about processing flows implemented by the server and the sending end after the server receives the response message, reference may be made to the foregoing method embodiment, which is not further described herein.

In the method for receiving a message provided by this embodiment of the present invention, reading status of a message to be read is fed back, so that a user at a sending end can know in time whether the short message has already been read, which improves communication efficiency and enhances user awareness of the reading status of the message to be read.

Figure 5:
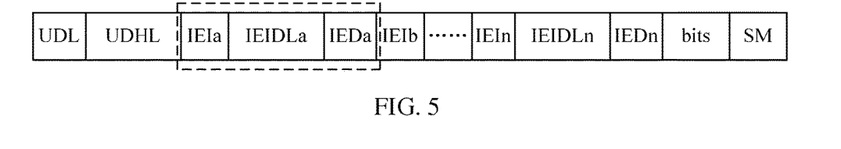
FIG. 5 is a schematic diagram of carrying a message number in a User Data Header (UDH) header according to an embodiment of the present invention.

In each of the foregoing method embodiments, the message number may be carried by using the following two manners:

The first carrying manner is an implicit carrying manner, that is, the message number is carried by using an idle field in a message header of the message to be read. In this embodiment of the present invention, a UDH in SMS specifications is extended to add a message number to a sent message. FIG. 5 is a schematic diagram of carrying a message number in a UDH header according to an embodiment of the present invention. The sending end carries a message number in a message header of each short message, where the message number uses a reserved field in a UDH identifier in the SMS specifications. Specifically, a length 0x2 of a message number is filled in IDEDLa, and a message number (for example 000 to 255 and 0x00 to 0xFF) is filled in IEDa to identify different messages. After the message number, for example, 257, is used, it may start from 1 once again. In the same session, messages are numbered according to a sequence of sending time. In different sessions, the numbers are not mutually affected. The sending end needs to save message numbers of all sessions.

The second carrying manner is an explicit carrying manner, that is, the message number is set in message content, and the message number is separated from text content of the message content by using a predetermined symbol. The explicit carrying manner provided in this embodiment is different from the foregoing implicit carrying manner in that: an encoded message number is carried in the message content, and the message number is visible in the message content. For example, a predetermined symbol, for example, "□" is added to the tail of the message content, which is a special symbol used to identify a start of the message number. A piece of message content is "Hello, long time no see!□001", where "Hello, long time no see!" is content manually edited by the user and "□001" is content automatically added by the client to the tail of the message content. The predetermined symbol "□" is followed by a three-digit message number from 000 to 255, which identifies different messages. After the message number 255 is used, the message number starts from 000 once again. The message to be read is numbered according to a sequence of transmission time.

Figure 6:
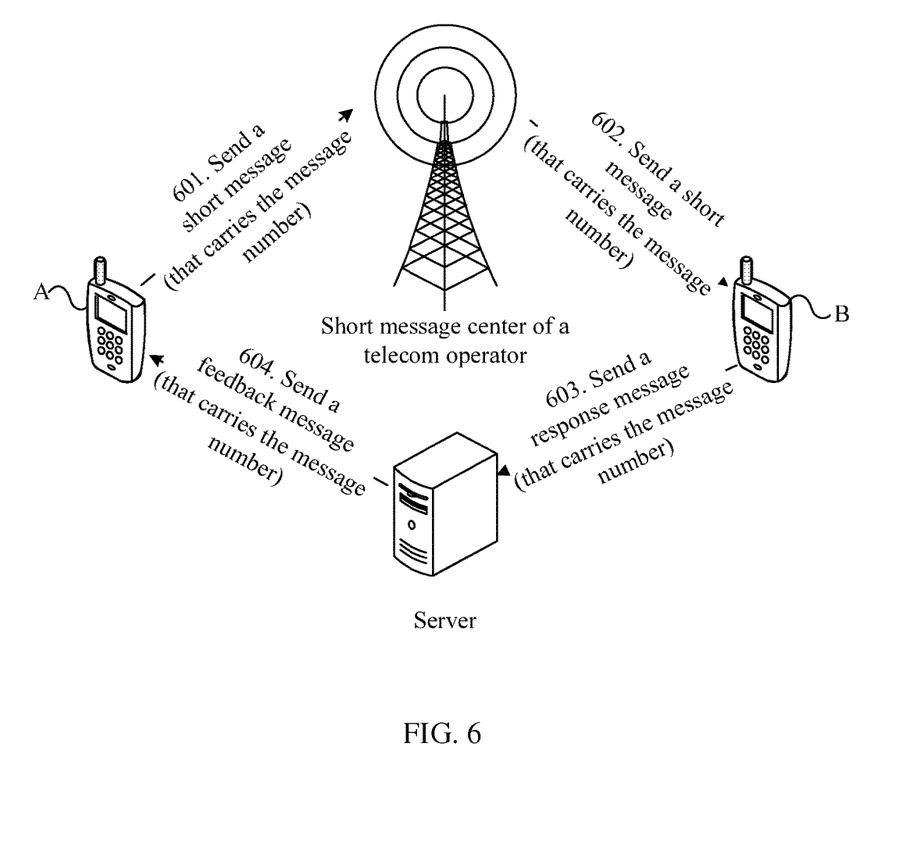
FIG. 6 is a flowchart of an embodiment of a method for sending a short message according to the present invention.

FIG. 6 is a flowchart of an embodiment of a method for sending a message according to the present invention. As shown in FIG. 6, the method includes:

Step 601: Terminal A sends a short message that carries a message number "001" to a short message center of an operator, where a receiver of the short message is terminal B.

All short messages sent by terminal A to terminal B may be numbered according to sending time, which ranges from "001" to "257". When there are 257 short messages, the short message may be numbered starting from "001" again. A message number may be carried by using an idle field in a message header of the short message. The message number may also be set in short message content of the short message, and the message number is separated from the short message content by using a predetermined symbol.

Step 602: The short message center of the operator sends the short message to terminal B.

Step 603: After a user of the receiver reads the short message, a short message application client of terminal B returns a response message to a server, where the response message carries a phone number of terminal B and a message number "001" of the short message.

In the embodiment of the present invention, interactions between the server and terminal A and terminal B are implemented over the IP protocol.

Step 604: The server then sends a feedback message that carries the phone number of terminal B and the message number to terminal A. Terminal A searches for a short message numbered "001" in a session list, identifies the short message in "read" status, and displays the short message.

Terminal A may only display a short message status updated at a most recent time segment. Assuming that status of a short message numbered "001" is "read" and status of a short message numbered "002" is "sent", the status of the short message numbered "001" is not displayed after the short message numbered "002" has been read, and only the status, that is, the "read" status, of the short message numbered "002" is displayed. The rest may be deduced in the same manner. When some short messages are read and some short messages are not read, the "read" status is displayed for a message that has been read most recently. The "sent" status is displayed behind the last one short message which is not read but is already sent.

Figure 7:
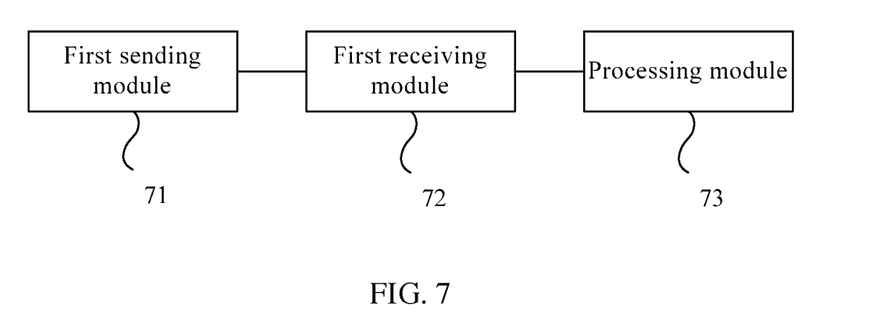
FIG. 7 is a schematic structural diagram of an embodiment of an apparatus for sending a message according to the present invention.

FIG. 7 is a schematic structural diagram of an embodiment of an apparatus for sending a message according to the present invention. As shown in FIG. 7, the apparatus for sending a message includes a first sending module 71, a first receiving module 72, and a processing module 73. The first sending module 71 is configured to send a message to be read to a receiving end, where the message to be read includes at least message content, a receiving end number, and a message number used to identify the message to be read. The first receiving module 72 is configured to receive a feedback message returned by a server, where the feedback message includes the receiving end number and the message number, and the feedback message is sent by the server after the server receives a response message that is sent by the receiving end and carries the receiving end number and the message number, where the response message is sent by the receiving end to the server after the receiving end confirms that the message to be read has been read. The processing module 73 is configured to change, according to the feedback message, status of the message to be read corresponding to the message number and in a session list corresponding to the receiving end number to read status.

Specifically, after receiving message content edited by a user, the first sending module 71 encapsulates the message content into a short message over a specified transmission protocol, where the short message may include the message content and a receiving end number, for example a mobile phone number of a user at the receiving end and may further include a sending end number, for example, information such as a mobile phone number of the user at the sending end. Each short message sent to the receiving end is allocated with a message number, for example, "001" and "002". Each message number may be allocated in a sequence of sending time. The first sending module 71 sends a short message to a network element device; after receiving a short message that carries a message number from the sending end, the network element device sends the short message to the receiving end; after a message application client of the receiving end knows, by means of detection, that the user has read the short message, the message application client of the receiving end may send a response message to the server over, for example, an IP network. After receiving the foregoing response message, the server may also send a feedback message that carries the message number and the receiving end number to the sending end over the IP network. After the first receiving module 72 receives the feedback message and knows that the short message has already been read, the processing module 73 may change status of the short message corresponding to the message number and in the session list corresponding to the receiving end number to read status In the foregoing apparatus embodiment, the message number may be carried by using an idle field in a message header of the message to be read; the message number may also be set in message content, and the message number is separated from text content of the message content by using a predetermined symbol.

Further, the feedback message further includes a message status code used to identify whether the message to be read has already been read.

The apparatus for sending a message provided by this apparatus embodiment may execute the processing steps executed by the receiving end in the foregoing method embodiments. For details about specific processes and explanations, reference may be made to the foregoing method embodiments, which are not further described herein.

In the apparatus for sending a message provided by this embodiment of the present invention, reading status of a message to be read is fed back, so that a user at a sending end can know in time whether the short message has already been read, which improves communication efficiency and enhances user awareness of the reading status of the message to be read.

Figure 8:
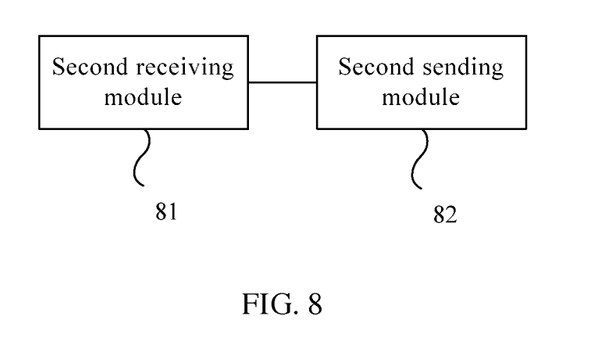
FIG. 8 is a schematic structural diagram of an embodiment of a server according to the present invention.

FIG. 8 is a schematic structural diagram of an embodiment of a server according to the present invention. As shown in FIG. 8, the server includes a second receiving module 81 and a second sending module 82. The second receiving module 81 is configured to receive a response message that is sent by a receiving end and carries a receiving end number and a message number, where the response message is sent by the receiving end after the receiving end confirms that a message to be read sent by a sending end to the receiving end has already been read, where the message to be read includes at least message content, the receiving end number, and the message number used to identify the message to be read. The second sending module 82 is configured to send a feedback message to the sending end, where the feedback message includes the receiving end number and the message number, so that the sending end changes, according to the feedback message, status information of a message corresponding to the message number and in a session list corresponding to the receiving end number to read status.

Specifically, after the receiving end receives a message to be read, for example, a short message that carries a message number from the sending end, the receiving end reads the short message. After the receiving end knows, by means of detection, that the short message has already been read, the receiving end may send a response message to the server over, for example, an IP network. After the second receiving module 81 receives the response message, the second sending module 82 may send a feedback message to the sending end over the IP network, and carry the receiving end number and the message number in the feedback message to indicate that the short message previously sent by the sending end whose destination number is the receiving end number and whose number is the message number has already been read. After receiving the feedback message and knowing that the short message has already been read, the sending end may change status of the short message corresponding to the message number and in the session list corresponding to the receiving end number to "read" status.

Further, the feedback message may further include a message status code used to identify whether the message to be read has already been read.

The server provided by this apparatus embodiment may execute the processing steps executed by the server in the foregoing method embodiments. For details about specific processes and explanations, reference may be made to the foregoing method embodiments, which are not further described herein.

In the server provided by this embodiment of the present invention, reading status of a message to be read is fed back, so that a user at a sending end can know in time whether the short message has already been read, which improves communication efficiency and enhances user awareness of the reading status of the message to be read.

Figure 9:
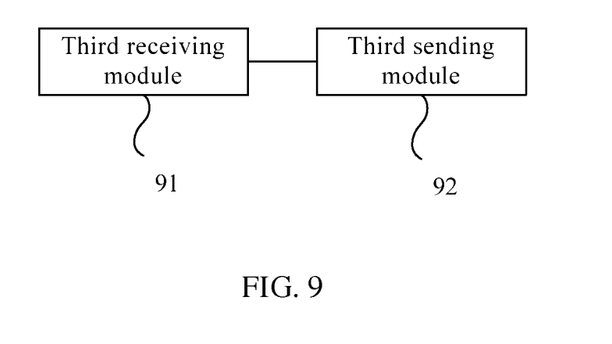
FIG. 9 is a schematic structural diagram of an embodiment of an apparatus for receiving a message according to the present invention.

FIG. 9 is a schematic structural diagram of an embodiment of an apparatus for receiving a message according to the present invention. As shown in FIG. 9, the apparatus for receiving a message includes a third receiving module 91 and a third sending module 92. The third receiving module 91 is configured to receive a message to be read from a sending end, where the message to be read includes at least message content, a receiving end number, and a message number used to identify the message to be read. The third sending module 92 is configured to send a feedback message to a server after the message to be read has been read, where the feedback message includes the receiving end number and the message number, so that the server sends a feedback message that carries the receiving end number and the message number to the sending end and the sending end changes, according to the feedback message, status information of a message corresponding to the message number and in a session list corresponding to the receiving end number to read status.

Specifically, the third receiving module 91 receives a message to be read, for example, a short message that is sent by the sending end by using the foregoing network element device; and after the third sending module 92 knows, by means of detection, that the short message has been read, the third sending module 92 may send a response message to the server over, for example, an IP network, and carry the receiving end number and the message number in the response message to notify the server that the short message sent by the sending end whose destination number is the receiving end number and whose number is the message number has already been read.

Further, the message number is carried by using an idle field in a message header of the message to be read; or, the message number is set in the message content and the message number is separated from text content of the message content by using a predetermined symbol.

The apparatus for receiving a message provided by this apparatus embodiment may execute the processing steps executed by the receiving end in the foregoing method embodiments. For details about specific processes and explanations, reference may be made to the foregoing method embodiments, which are not further described herein.

In the apparatus for receiving a message provided by this embodiment of the present invention, reading status of a message to be read is fed back, so that a user at a sending end can know in time whether the short message has already been read, which improves communication efficiency and enhances user awareness of the reading status of the message to be read.

Figure 10:
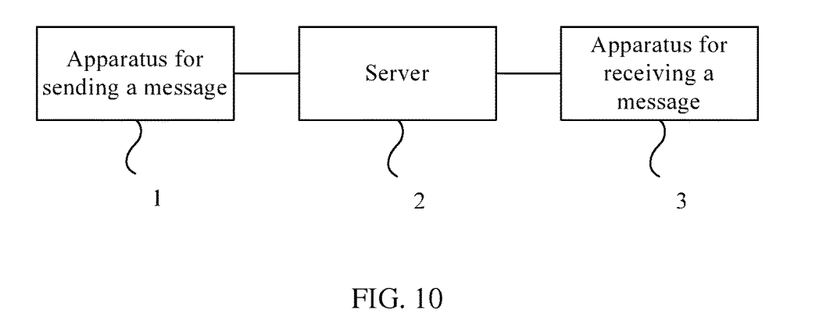
FIG. 10 is a schematic structural diagram of an embodiment of a network system according to the present invention.

FIG. 10 is a schematic structural diagram of an embodiment of a network system according to the present invention. As shown in FIG. 10, the network system includes an apparatus 1 for sending a message, a server 2, and an apparatus 3 for receiving a message. The apparatus 1 for sending a message sends a message to be read that carries a message number to the apparatus 3 for receiving a message. After reading the message to be read, the apparatus 3 for receiving a message sends a response message that carries the message number to the server; and the server 2 returns a feedback message used to indicate that the message to be read has already been read to the apparatus 1 for sending a message. At this point, the apparatus 1 for sending a message knows that the message to be read has already been read by the apparatus 3 for receiving a message.

The apparatus for sending a message, the server, and the apparatus for receiving a message included in the system provided by this embodiment of the present invention may use the apparatuses provided by each of the foregoing apparatus embodiments. For details about executed operations, reference may be made to processes in each of the foregoing method embodiments, which is not further described herein.

Figure 11:
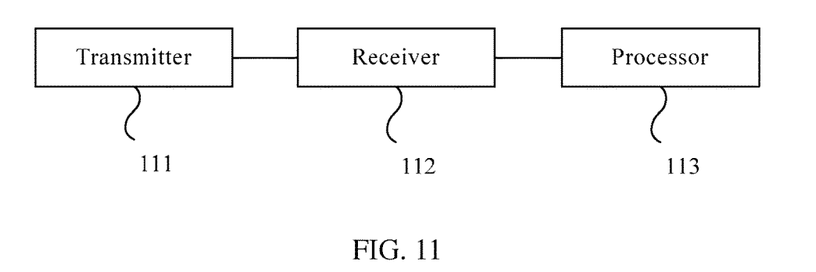
FIG. 11 is a schematic structural diagram of another embodiment of an apparatus for sending a message according to the present invention.

FIG. 11 is a schematic structural diagram of another embodiment of an apparatus for sending a message according to the present invention. As shown in FIG. 11, the apparatus for sending a message includes a transmitter 111, a receiver 112, and a processor 113. The transmitter 111 is configured to send a message to be read to a receiving end, where the message to be read includes at least message content, a receiving end number, and a message number used to identify the message to be read. The receiver 112 is configured to receive a feedback message returned by a server, where the feedback message includes the receiving end number and the message number, and the feedback message is sent by the server after the server receives a response message that is sent by the receiving end and carries the receiving end number and the message number, where the response message is sent by the receiving end to the server after the receiving end confirms that the message to be read has been read. The processor 113 is connected to the receiver, and is configured to change, according to the feedback message, status of the message to be read corresponding to the message number and in a session list corresponding to the receiving end number to read status.

The apparatus for sending a message provided by this apparatus embodiment may execute processing steps executed by the receiving end in the foregoing method embodiments. For details about specific processes and explanations, reference may be made to the foregoing method embodiments, which are not further described herein.

In the apparatus for sending a message provided by this embodiment of the present invention, reading status of a message to be read is fed back, so that a user at a sending end can know in time whether the short message has already been read, which improves communication efficiency and enhances user awareness of the reading status of the message to be read.

Figure 12:
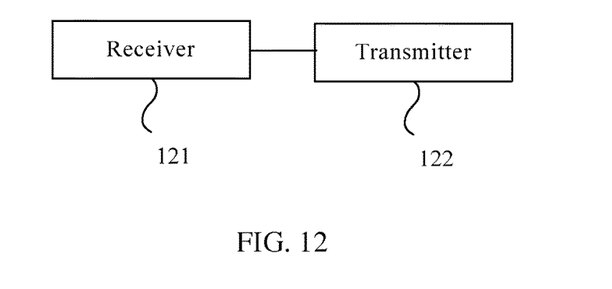
FIG. 12 is a schematic structural diagram of another embodiment of a server according to the present invention.

FIG. 12 is a schematic structural diagram of another embodiment of a server according to the present invention. As shown in FIG. 12, the server includes a receiver 121 and a transmitter 122. The receiver 121 is configured to receive a response message that is sent by a receiving end and carries a receiving end number and a message number, where the response message is sent by the receiving end after the receiving end confirms that a message to be read sent by a sending end to the receiving end has already been read, where the message to be read includes at least message content, the receiving end number, and the message number used to identify the message to be read. The transmitter 122 is configured to send a feedback message to the sending end, where the feedback message includes the receiving end number and the message number, so that the sending end changes, according to the feedback message, status information of a message corresponding to the message number and in a session list corresponding to the receiving end number to read status.

The server provided by this apparatus embodiment may execute processing steps executed by the server in the foregoing method embodiments. For details about specific processes and explanations, reference may be made to the foregoing method embodiments, which are not further described herein.

In the server provided by this embodiment of the present invention, reading status of a message to be read is fed back, so that a user at a sending end can know in time whether the short message has already been read, which improves communication efficiency and enhances user awareness of the reading status of the message to be read.

Figure 13:
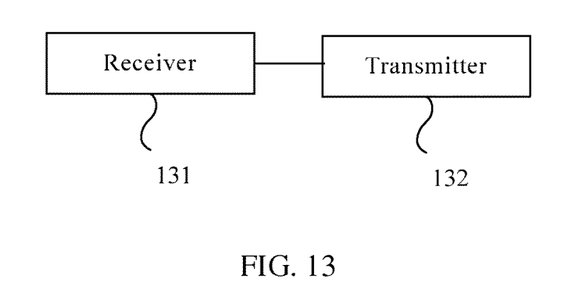
FIG. 13 is a schematic structural diagram of another embodiment of an apparatus for receiving a message according to the present invention.

FIG. 13 is a schematic structural diagram of another embodiment of an apparatus for receiving a message according to the present invention. As shown in FIG. 13, the apparatus for receiving a message includes a receiver 131 and a transmitter 132. The receiver 131 is configured to receive a message to be read from a sending end, where the message to be read includes at least message content, a receiving end number, and a message number used to identify the message to be read. The transmitter 132 is configured to send a feedback message to a server after the message to be read has been read, where the feedback message includes the receiving end number and the message number, so that the server sends a feedback message that carries the receiving end number and the message number to the sending end and the sending end changes, according to the feedback message, status information of a message corresponding to the message number and in a session list corresponding to the receiving end number to read status.

The apparatus for receiving a message provided by this apparatus embodiment may execute processing steps executed by the receiving end in the foregoing method embodiments. For details about specific processes and explanations, reference may be made to the foregoing method embodiments, which are not further described herein.

In the apparatus for receiving a message provided by this embodiment of the present invention, reading status of a message to be read is fed back, so that a user at a sending end can know in time whether the short message has already been read, which improves communication efficiency and enhances user awareness of the reading status of the message to be read.

Figure 14:
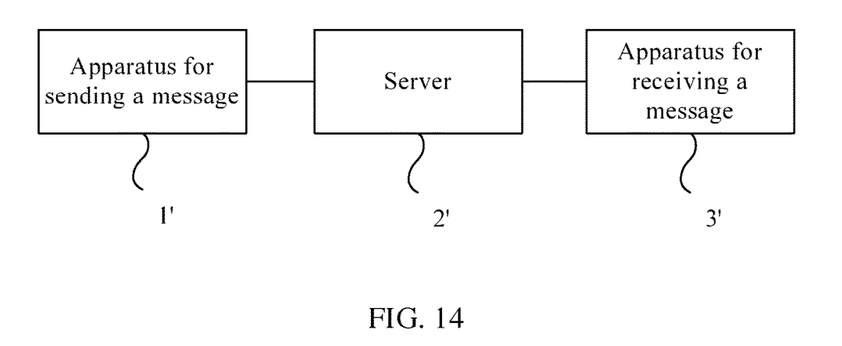
FIG. 14 is a schematic structural diagram of another embodiment of a network system according to the present invention.

FIG. 14 is a schematic structural diagram of another embodiment of a network system according to the present invention. As shown in FIG. 14, the network system includes an apparatus 1' for sending a message, a server 2', and an apparatus 3' for receiving a message. The apparatus 1' for sending a message sends a message to be read that carries a message number to the apparatus 3' for receiving a message. After reading the message to be read, the apparatus 3' for receiving a message sends a response message that carries the message number to the server; and the server 2' returns a feedback message used to indicate that the message to be read has already been read to the apparatus 1' for sending a message. At this point, the apparatus 1' for sending a message knows that the message to be read has already been read by the apparatus 3' for receiving a message.

The apparatus for sending a message, the server, and the apparatus for receiving a message included in the system provided by this embodiment of the present invention may use the apparatuses provided by each of the foregoing apparatus embodiments. For details about executed operations, reference may be made to processes in each of the foregoing method embodiments, which is not further described herein.

In the several embodiments provided in the present invention, it should be understood that the disclosed apparatus and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of hardware plus a software functional unit.

When the foregoing integrated unit is implemented in a form of a software functional unit, the integrated unit may be stored in a computer-readable storage medium. The software functional unit is stored in a storage medium and includes several instructions for instructing a computer device (which may be a personal computer, a server, or a network device) or a processor to perform a part of the steps of the methods described in the embodiments of the present invention. The foregoing storage medium includes: any medium that can store program code, such as a universal serial bus (USB) flash drive, a removable hard disk, a read-only memory (ROM), a random-access memory (RAM), a magnetic disc, or an optical disc.

A person skilled in the art may clearly understand that, for description convenience and brevity, the division of each of the foregoing functional modules is merely described as an example. In actual application, the foregoing functions may be implemented by different functional modules as needed, that is, an internal structure of the apparatus is divided into different functional modules to perform all or part of the functions described hereinbefore. For a detailed working process of the foregoing apparatus, reference may be made to a corresponding process in the foregoing method embodiments, and details are not described herein again.

Finally, it should be noted that the foregoing embodiments are merely intended for describing the technical solutions of the present invention other than limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A method for sending a message, the method comprising:

sending, by a first terminal to a second terminal, a first message, wherein the first message comprises first message content, a second terminal number, and a first message number used to identify the first message;

updating, by the first terminal, a status of the first message to a delivered status;

displaying, by the first terminal, the delivered status of the first message;

receiving, by the first terminal, a first feedback message from a server, wherein the first feedback message comprises the second terminal number and the first message number;

updating, by the first terminal, the status of the first message to a read status according to the first feedback message;

displaying, by the first terminal, the read status of the first message;

sending, by the first terminal to the second terminal, a second message, wherein the second message comprises second message content, the second terminal number, and a second message number used to identify the second message;

updating, by the first terminal, a status of the second message to a delivered status;

displaying, by the first terminal, the delivered status of the second message;

receiving, by the first terminal, a second feedback message from the server, wherein the second feedback message comprises the second terminal number and the second message number;

updating, by the first terminal, the status of the second message to a read status according to the second feedback message;

displaying, by the first terminal, the read status of the second message, while the status of the first message is not displayed.

2. The method of claim 1, wherein the first message number is carried using an idle field in a message header of the first message.

3. The method of claim 1, wherein the first message number is set in the message content, and wherein the message number is separated from text content of the message content using a predetermined symbol.

4. The method of claim 1, wherein the first feedback message further comprises a message status code used to identify whether the first message has already been read.

5. The method of claim 1, wherein the first message, the second message, the first feedback message, and the second feedback message are sent over an Internet Protocol (IP) network.

6. The method of claim 1 further comprising:
sending, by the first terminal to the second terminal, a third message, wherein the third message comprises third message content, the second terminal number, and a third message number used to identify the third message;
updating, by the first terminal, a status of the third message to a delivered status;
displaying, by the first terminal, the read status of the second message and the delivered status of the third message, while the status of the first message is not displayed.

7. The method of claim 1, wherein the first message number and the second message number are allocated based on a sequence of sending time by the first terminal.

8. A method for receiving a message, the method comprising:
receiving, by a second terminal from a first terminal, a first message, wherein the first message comprises first message content, a second terminal number, and a first message number used to identify the first message;
after the first message has been read, sending a first response message to a server, in order to trigger the first terminal to update a status of the first message to a read status and display the read status of the first message;
receiving, by the second terminal form the first terminal, a second message, wherein the second message comprises second message content, the second terminal number, and a second message number used to identify the second message; and
after the second message has been read, sending a second response message to a server in order to trigger the first terminal to update a status of the second message to a read status and display the read status of the second message while not displaying the status of the first message.

9. The method of claim 8, wherein the first message number is carried using an idle field in a message header of the first message.

10. The method of claim 8, wherein the first message number is set in the message content, and wherein the first message number is separated from text content of the first message content using a predetermined symbol.

11. The method of claim 8, wherein the first message, the second message, the first response message and the second response message are sent over an Internet Protocol (IP) network.

12. A first terminal comprising:
a transmitter configured to send, to a second terminal, a first message, wherein the first message comprises first message content, a second terminal number, and a first message number used to identify the first message;
a processor coupled to the transmitter, the processor configured to update a status of the first message to a delivered status;
a display coupled to the processor, the display configured to display the delivered status of the first message; and
a receiver coupled to the processor, the receiver configured to receive a first feedback message from a server, wherein the feedback message comprises the second terminal number and the first message number,
the processor further configured to update the status of the first message to a read status,
the display further configured to display the read status of the first message,
the transmitter further configured to send, to the second terminal, a second message, wherein the second message comprises second message content, the second terminal number, and a second message number used to identify the second message,
the processor further configured to update a status of the second message to a delivered status,
the display further configured to display the delivered status of the second message,
the receiver further configured to receive a second feedback message from the server, wherein the second feedback message comprises the second terminal number and the second message number,
the processor further configured to update the status of the second message to a read status according to the second feedback message, and
the display further configured to display the read status of the second message, while the status of the first message is not displayed.

13. The first terminal of claim 12, wherein the first message number and the second message number are allocated based on a sequence of sending time by the first terminal.

14. The first terminal of claim 12, wherein the first message number and the second message number are allocated in a sequence of sending time by the first terminal.

15. The first terminal of claim 12, wherein the transmitter is further configured to send, to the second terminal, a third message, wherein the third message comprises third message content, the second terminal number, and a third message number used to identify the third message,
wherein the processor is further configured to update a status of the third message to a delivered status, and
wherein the display is further configured to display the read status of the second message and the delivered status of the third message, while the status of the first message is not displayed.

16. The first terminal of claim 12, wherein the first message, the second message, the first feedback message, and the second feedback message are sent over an internet protocol (IP) network.

17. The first terminal of claim 12, wherein the first message number is carried using an idle field in a message header of the first message.

18. The first terminal of claim 12, wherein the first message number is set in the message content, and wherein the first message number is separated from text content of the message content using a predetermined symbol.

* * * * *